(12) United States Patent
Koza et al.

(10) Patent No.: US 8,177,487 B2
(45) Date of Patent: May 15, 2012

(54) ROTARY MACHINE BALANCE WEIGHTS

(75) Inventors: Kenneth Michael Koza, Ballston Lake, NY (US); Allyn Keith Holliday, Rotterdam Junction, NY (US); John Patrick McGrane, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 450 days.

(21) Appl. No.: 12/435,324

(22) Filed: May 4, 2009

(65) Prior Publication Data
US 2010/0278634 A1    Nov. 4, 2010

(51) Int. Cl.
*F01D 25/04* (2006.01)
(52) U.S. Cl. ........................................................ 415/119
(58) Field of Classification Search .................. 415/119; 416/144, 500, 145, 215; 74/753 R
See application file for complete search history.

(56) References Cited

U.S. PATENT DOCUMENTS

| | | | |
|---|---|---|---|
| 3,736,811 A | 6/1973 | Neary | |
| 4,477,226 A | 10/1984 | Carreno | |
| 4,842,485 A | 6/1989 | Barber | |
| 5,018,943 A | 5/1991 | Corsmeier et al. | |
| 6,279,420 B1 * | 8/2001 | Knorowski et al. | 464/180 |
| 6,477,916 B2 | 11/2002 | Knorowski et al. | |
| 6,481,969 B2 * | 11/2002 | Berry et al. | 416/145 |
| 7,234,916 B2 | 6/2007 | Lee et al. | |
| 7,371,042 B2 | 5/2008 | Lee | |
| 7,465,146 B2 | 12/2008 | Kennedy et al. | |
| 2005/0265846 A1 | 12/2005 | Przytulski et al. | |

* cited by examiner

*Primary Examiner* — Alexander Gilman
(74) *Attorney, Agent, or Firm* — Fletcher Yoder

(57) ABSTRACT

In a one embodiment, a balance weight includes a base, a rotational axis extending from the base, and a circumference having opposite cam surfaces about the rotational axis. The opposite cam surfaces are at least partially angled toward one another in a direction away from the base along the rotational axis. The balance weight is designed to mount in a groove of a rotary component of a turbine engine.

20 Claims, 7 Drawing Sheets

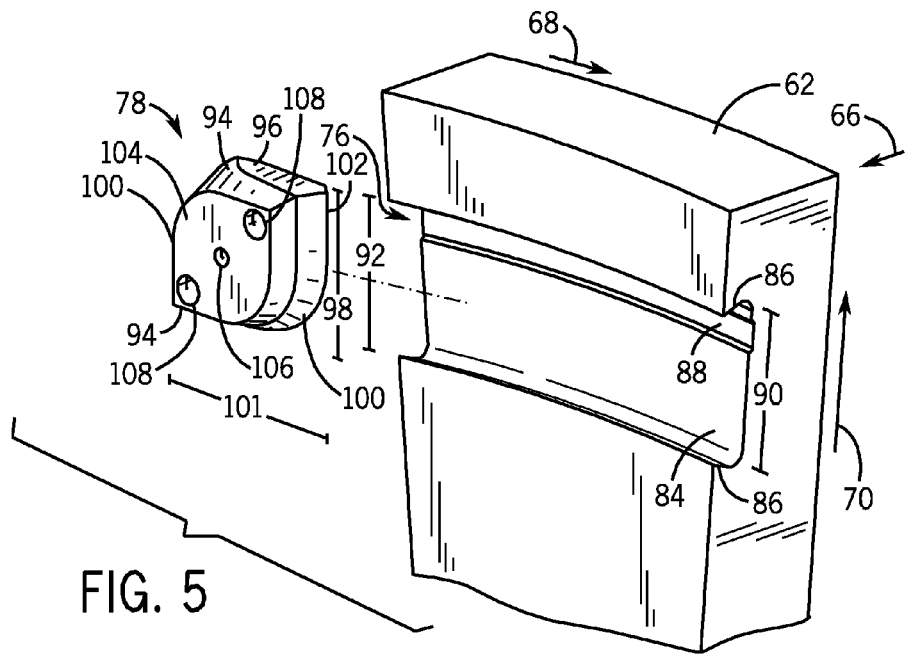
FIG. 5
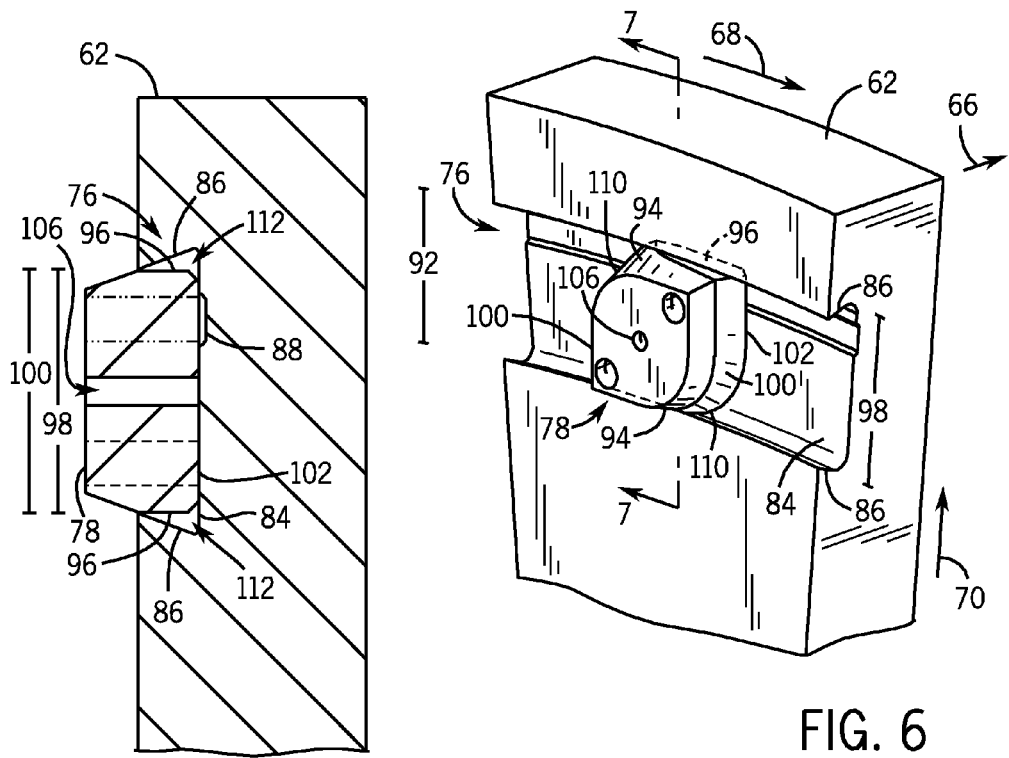
FIG. 7
FIG. 6

ROTARY MACHINE BALANCE WEIGHTS

BACKGROUND OF THE INVENTION

The subject matter disclosed herein relates to balance weights for rotary machines.

In general, balance weights may be employed in rotary machines, such as gas turbines, steam turbines, generators, and compressors. The balance weights may be used to balance rotating components. For example, the balance weights may be employed to reduce vibrations and/or to compensate for rotational effects of modified or omitted rotary components, such as a bowed rotor or missing or omitted blades or covers. The balance weights may be positioned at various locations along a rotor, wheel, or other rotary component, and may be adjusted at the factory and/or in the field.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a rotary machine that has a rotary component with a groove and a balance weight disposed in the groove. The groove includes a base and first tapered sides converging toward one another in a first direction away from the base to form an opening. The balance weight includes a body and second tapered sides converging toward one another in the first direction, and the balance weight is designed to pass through the opening into the groove and rotate to engage the first and second tapered sides.

In a second embodiment, a system includes a balance weight designed to mount in a groove of a rotary component of a turbine engine. The balance weight includes a base, a rotational axis extending from the base, and a circumference having opposite cam surfaces about the rotational axis. The opposite cam surfaces are at least partially angled toward one another in a direction away from the base along the rotational axis.

In a third embodiment, a system includes a rotary component with an annular groove with a generally uniform opening and tapered sides converging towards one another from a base of the annular groove to the generally uniform opening. The system also includes a balance weight disposed in the annular groove. The balance weight includes an asymmetrical circumference with a first pair of opposite sides separated by a first width and a second pair of opposite sides separated by a second width greater than the first width. The balance is designed to pass through the generally uniform opening when the first pair of opposite sides are generally parallel to the tapered sides and rotate within the annular groove to dispose the second pair of opposite sides generally parallel to the tapered sides.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is a perspective view of a wheel with a balance weight exploded from a groove within the wheel;

FIG. 6 is a perspective view of the wheel of FIG. 5 with the balance weight inserted in the groove;

FIG. 7 is a cross-sectional view through the wheel of FIG. 6 taken along line 7-7;

DETAILED DESCRIPTION OF THE INVENTION

Figure 1:
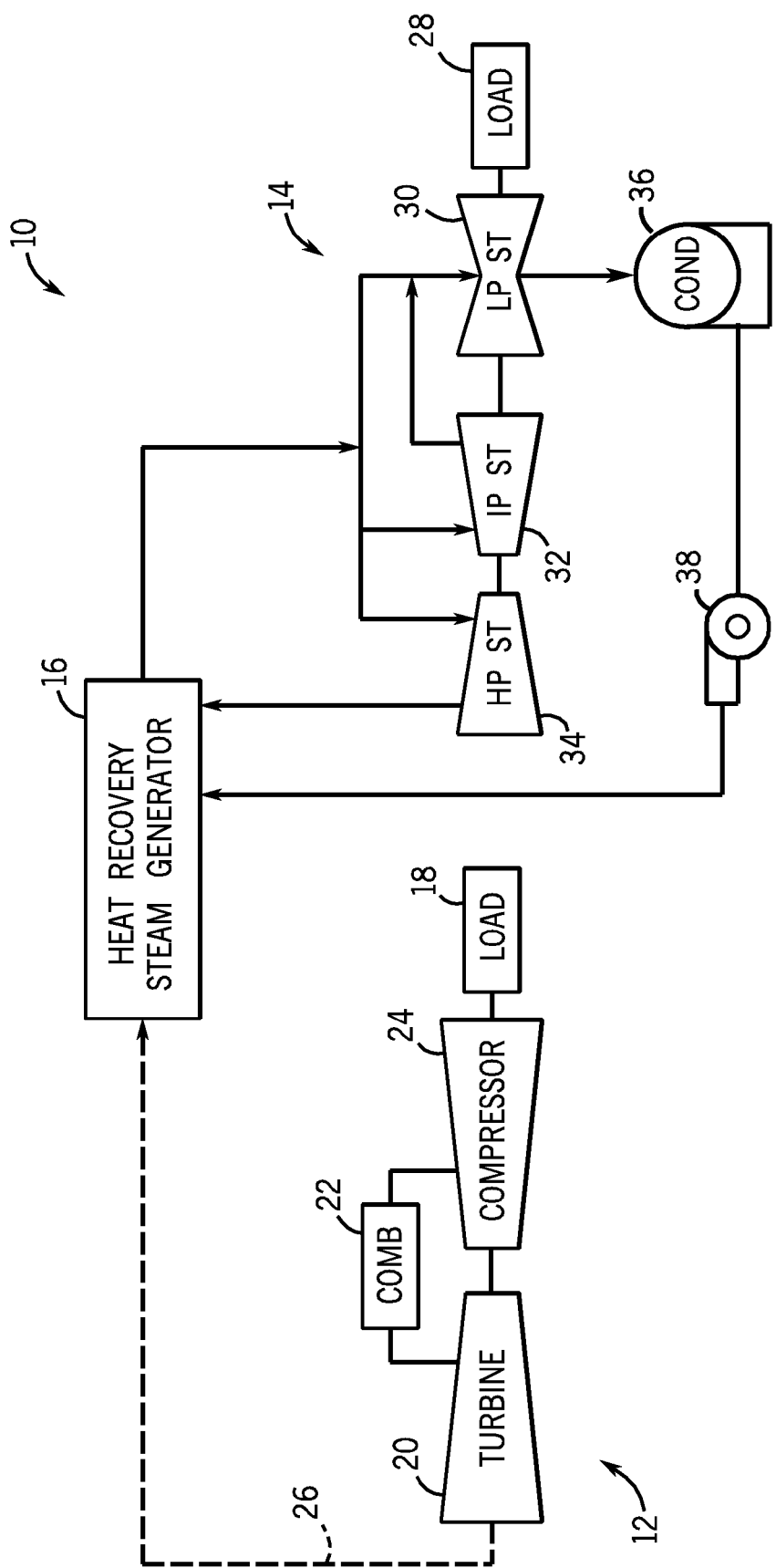
FIG. 1 is a schematic flow diagram of an embodiment of a combined cycle power generation system that may employ balance weights.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to balance weights for rotary machines, such as gas turbines, steam turbines, wind turbines, hydro turbines, compressors, and generators. In general, balance weights may be positioned within rotary components of the rotary machines to balance the rotary components during operation. The balance weights may include two sets of opposing sides separated by cam surfaces. The first set of opposing sides may be separated by a smaller width and the second set of opposing sides may be separated by a larger width. The different widths may allow the balance weights to be inserted at any location along a groove within a rotary component. For example, the groove may include tapered sides converging towards one another to form an opening smaller than the base of the groove. The smaller width of the balance weight may be approximately equal to or smaller than the groove opening. Accordingly, the first set of opposing sides may be aligned with the tapered sides to insert the balance weight into the groove. After insertion, the balance weight may be rotated approximately ninety degrees within the groove to align the second opposite sides with the tapered sides of the groove. The second opposite sides may generally extend into the groove beyond the opening to retain the balance weight within the groove. Accordingly, the balance weights may be inserted and positioned within the groove at any location along the groove. That is, no separate openings, holes, or local engagement features need to be provided at locations along the groove to allow insertion of the balance weights. Moreover, rather than providing tapped holes for balance weights that are inserted into specific openings (i.e. plug or gate type balance weights), the grooves may be machined into the rotary components, which in turn may reduce machining cycles, times, and/or manufacturing costs.

FIG. 1 is a schematic flow diagram of an embodiment of a combined cycle power generation system 10 that may employ balance weights. The system 10 may include a gas turbine 12, a steam turbine 14, and a heat recovery steam generation (HRSG) system 16. Within the gas turbine 14, gas, such as syngas, may be combusted to generate power within a "topping," or Brayton, cycle. Exhaust gas from the gas turbine 14 may be supplied to the HRSG system 16 to generate steam within a "bottoming," or Rankine, cycle. In certain embodiments, the gas turbine 12, the steam turbine 14, and the HRSG system 16 may be included within an integrated gasification combined cycle (IGCC) power plant.

The gas turbine 12 may generally combust a fuel (e.g., liquid and/or gas fuel) to drive a first load 18. The first load 18 may, for instance, be an electrical generator for producing electrical power. The gas turbine 12 may include a turbine 20, a combustor or combustion chamber 22, and a compressor 24. Exhaust gas 26 from the gas turbine 20 may be used to generate steam supplied to steam turbine 14 (through the HRSG system 16) for driving a second load 28. The second load 28 also may be an electrical generator for generating electrical power. However, both the first and second loads 18 and 28 may be other types of loads capable of being driven by the gas turbine 12 and steam turbine 14. Further, although the gas turbine 12 and steam turbine 14 are depicted as driving separate loads 18 and 28, the gas turbine 12 and steam turbine 14 also may be utilized in tandem to drive a single load via a single shaft. In the illustrated embodiment, the steam turbine 14 may include one low-pressure section 30 (LP ST), one intermediate-pressure section 32 (IP ST), and one high-pressure section 34 (HP ST). However, the specific configuration of the steam turbine 14, as well as the gas turbine 12, may be implementation-specific and may include any combination of sections.

The system 10 also includes the HRSG system 16 for employing heat from the gas turbine 12 to generate steam for the steam turbine 14. The HRSG system 16 may include components such as evaporators, economizers, heaters, superheaters, and attemperators, among others, that are used to generate a high-pressure, high-temperature steam. The steam produced by the HRSG system 16 may be supplied to the low-pressure section 30, the intermediate pressure section 32, and the high-pressure section 34 of the steam turbine 14 for power generation. Exhaust from the low-pressure section 30 may be directed into a condenser 36. Condensate from the condenser 36 may, in turn, be returned to the HRSG system 16 with the aid of a condensate pump 38. Within the HRSG system 16, the condensate may then be reheated to generate steam for the steam turbine 14.

The balance weights may be used to balance rotary components within the combined cycle system 10. For example, the balance weights may be used in the gas turbine 12, the compressor 24, the steam turbine 14, and/or in the HRSG system 16. In other embodiments, the balance weights may be used in independent rotary machines. For example, the balance weights may be used in a gas turbine, steam turbine, compressor, or generator that is part of a simple cycle system. Moreover, the balance weights may be employed in other types of rotary machines, such as wind turbines and hydro turbines.

Figure 2:
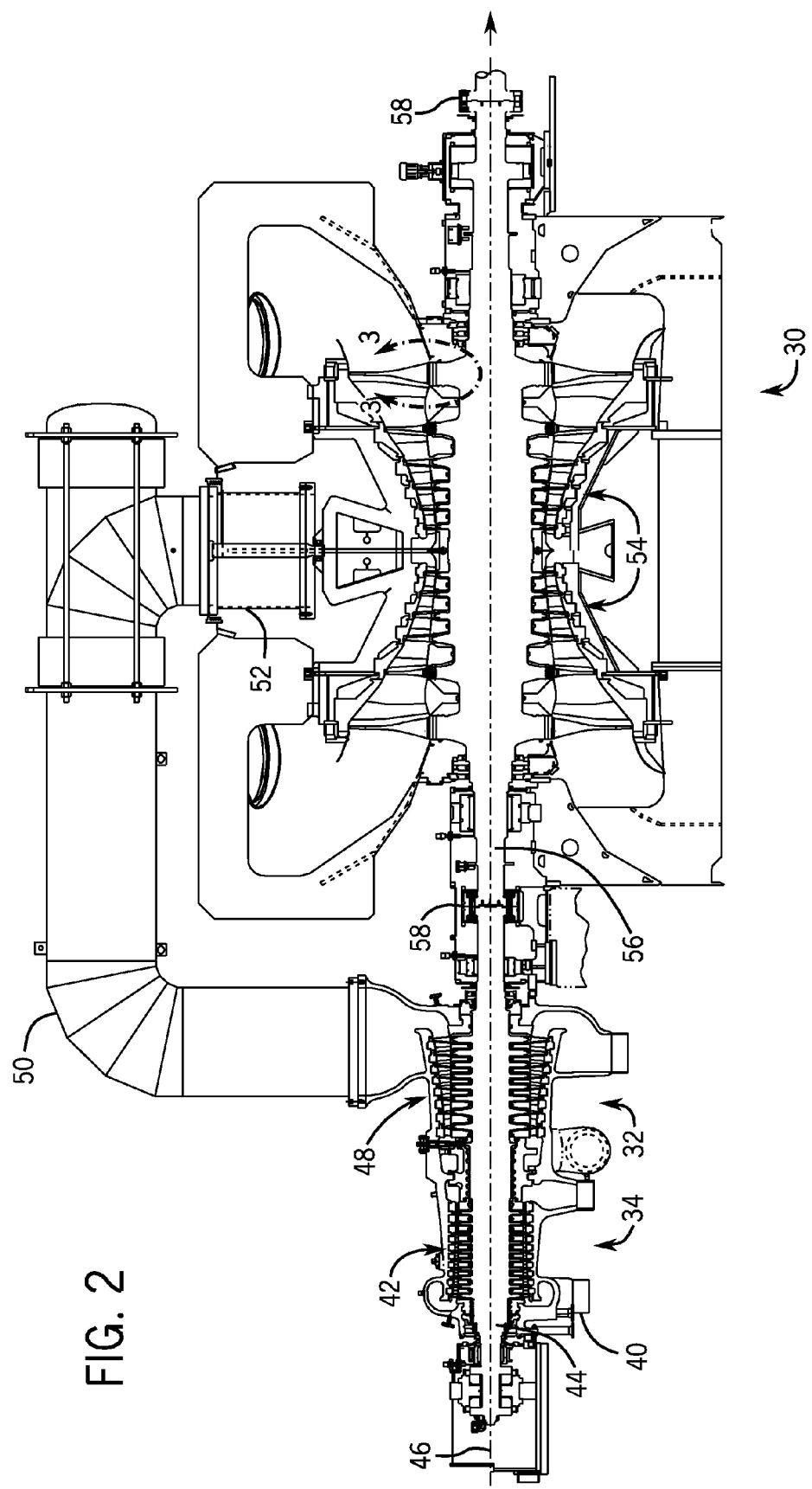
FIG. 2 is a cross-sectional view of an embodiment of the steam turbine of FIG. 1.

FIG. 2 depicts an embodiment of the steam turbine 14 that includes the high-pressure-section 34, the intermediate-pressure section 32, and the low-pressure section 30 of FIG. 1. The steam turbine 14 includes a main steam inlet port 40 that may receive steam, for example, from the HRSG system 16 of FIG. 1. The steam may flow through a series of stages 42. In general, each stage 42 may include circumferentially spaced blades mounted to a wheel encircling a shaft 44 that rotates about an axis 46. From the high-pressure section 34, the steam may enter the intermediate-pressure section 32 and flow through another series of stages 48, each including circumferentially spaced blades mounted to a wheel encircling the shaft 44. In certain embodiments, the steam may undergo heating before flowing into the intermediate-pressure section 32.

From the intermediate-pressure section 32, the steam may flow to the low-pressure section 30 through a crossover pipe 50 and an inlet box 52. Within the low-pressure section 30, the steam may flow in opposite axial directions through a series of stages 54, each including circumferentially spaced blades mounted to a wheel encircling a shaft 56 that rotates about the axis 46. The shaft 56 may include flanges 58 disposed on axially opposite ends to couple the shaft 56 to the shaft 44 on one end, and to couple the shaft 56 to a generator shaft (not shown) on the other end. In certain embodiments, balance weights may be included on the flanges 58 and/or on the wheels within the stages 42, 48, and 54.

Figure 3:
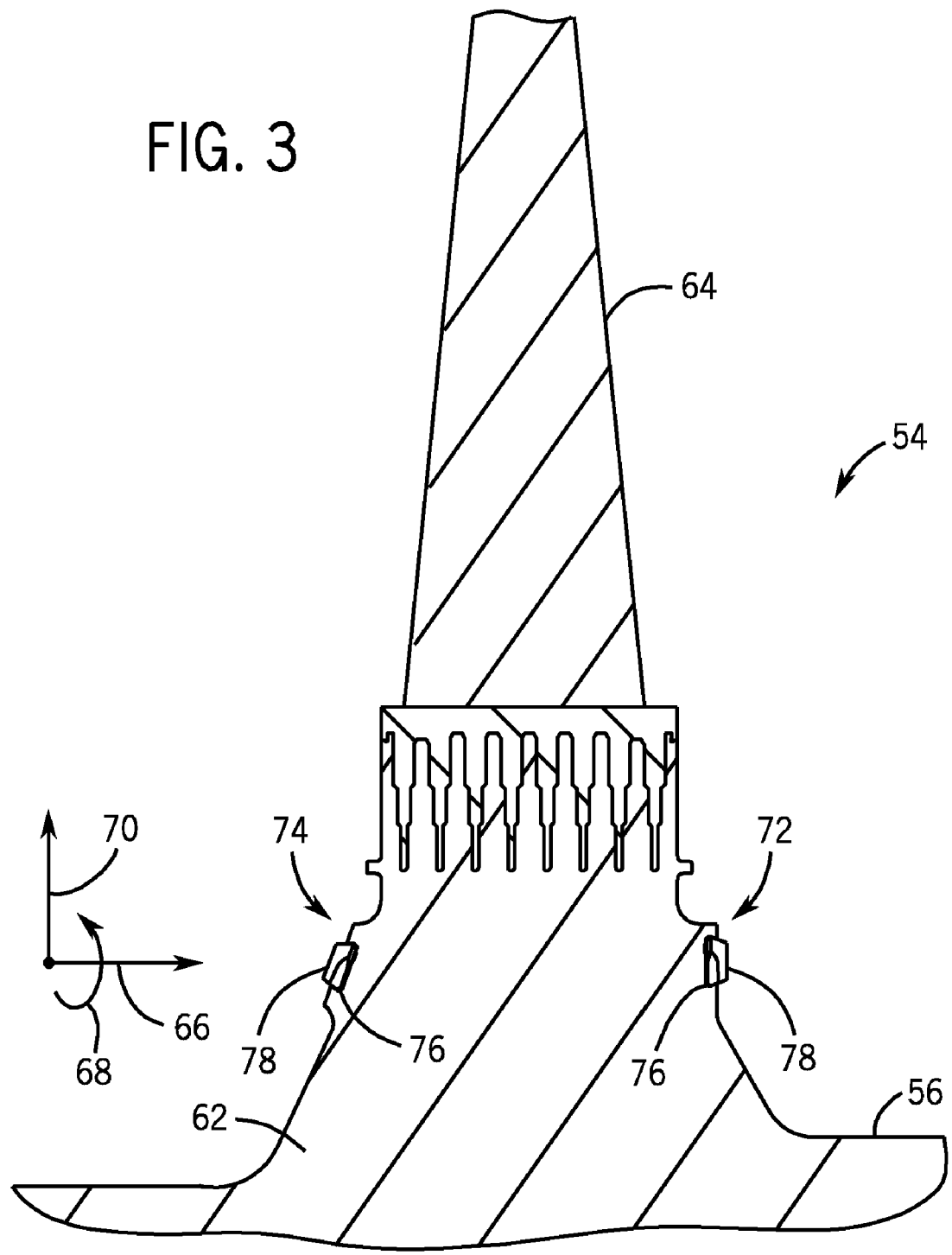
FIG. 3 is a cross-sectional view of an embodiment of one of the wheels of FIG. 2.

FIG. 3 is a cross-sectional view of a portion of one of the low-pressure stages 54 taken within line 3-3 of FIG. 2. A wheel 62 may be mounted to and may encircle the shaft 56. Although only one wheel 62 is shown, in certain embodiments, multiple wheels 62 may be axially spaced (direction 66) along the shaft 56. Each wheel 62 may extend circumferentially (direction 68) around the shaft 56. A series of blades 64 may extend radially (direction 70) from the wheel 62 and may be circumferentially 68 spaced around the wheel 62. The wheel 62 may include axially 66 opposite faces 72 and 74, each containing a groove 76 for receiving balance weights 78. The grooves 76 may extend circumferentially 68 in whole or in part around the wheel 62. For example, each groove 76 may include a single, continuous and annular groove disposed 360-degrees about the shaft 56, or each groove 76 may include multiple short grooves in a segmented manner about the shaft 56. The grooves 76 may extend in a plane generally parallel to the radial direction (e.g., the groove 76 in axial face 72), and/or the grooves 76 may be inclined with respect to the radial direction (e.g., the groove 76 in axial face 74). The balance weights 78 may be disposed at various circumferential 68 locations around the grooves 76. Moreover, in certain embodiments, the balance weights 78 may be repositioned, removed, or added to balance the wheel 62.

Figure 4:
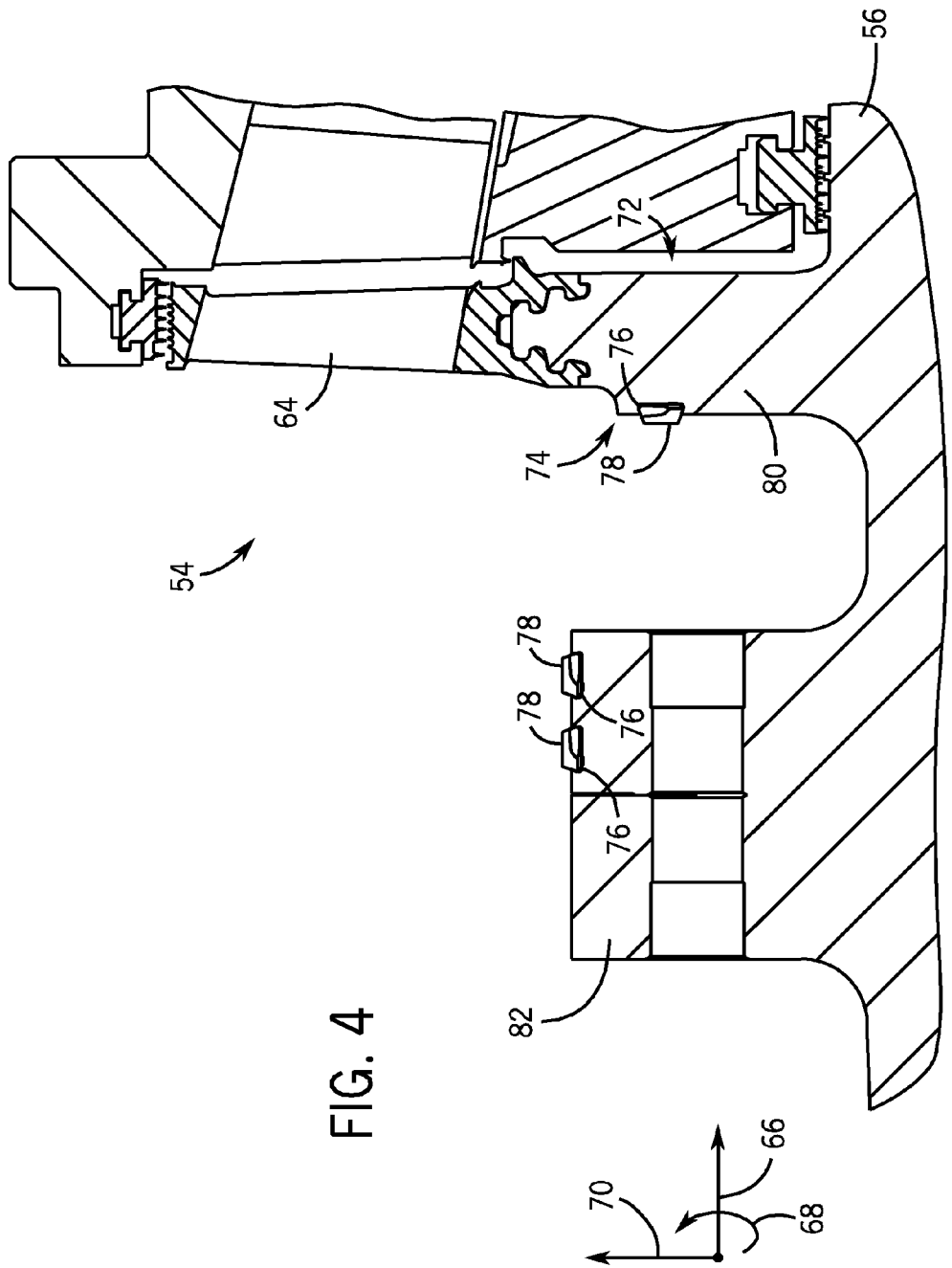
FIG. 4 is a cross-sectional view of another embodiment of one of the wheels of FIG. 2.

FIG. 4 is a cross-sectional view of another embodiment of a portion of the low-pressure stage 54. A wheel 80 extends circumferentially 68 around the shaft 56 and includes the axial faces 72 and 74. However, in this embodiment, the groove 76 is disposed on one of the faces 72. The groove 76 includes one or more balance weights 78. In other embodiments, grooves 76 may be included in one or both of the axial faces 72 and 74. Moreover, the axial faces 72 and 74 may extend parallel to or at various angles with respect to the radial direction 70.

A rotor flange 82 also extends radially 70 from the shaft 56. As noted above with respect to FIG. 2, the rotor flange 82 may be used to couple multiple shafts together. The rotor flange 82 includes grooves 76 that extend circumferentially 68 about the shaft 56. Although a pair of grooves 76 is shown, any number of grooves 76 may be included within the rotor flange 82. One or more balance weights 76 may be positioned in the grooves 76 to balance the shaft 56. As shown, the grooves 76 encircle the shaft 56 and include openings extending in the radial direction 70. However, in other embodiments, the grooves may encircle the shaft 56 and have openings extending in the axial direction 66, for example, in a manner similar to the groove 76 disposed on the wheel 80.

FIG. 5 is a perspective view of the wheel 62 depicting the balance weight 78 and the groove 76. The groove 76 includes a generally flat base 84 surrounded by a pair of tapered sides 86 that converge towards each other away from the base 84. In certain embodiments, the tapered sides 86 may converge towards one another at angles of at least approximately 10, 20, 30, 40, 50, 60, 70, 80, or 90 degrees. A slot 88 extends circumferentially 68 along a radially 70 outward portion of the base 84. However, in other embodiments, the slot 88 may be disposed along a radially 70 inward portion of the base 84. The base 84 may have a width 90 that is generally constant around the circumference of the wheel 62. The tapered sides 86 extend axially 66 outward from the base 84 and converge towards one another to form an opening of the groove 76 that has a width 92. Width 92 may be smaller than width 90 and may be generally uniform around the circumference of the wheel 62. More specifically, larger access openings are not included around the groove 76. The balance weights 78 are inserted into the groove 76 through the opening formed by the tapered sides 86.

FIG. 5 also depicts the balance weight 78 exploded from the wheel 62 and the groove 76. The balance weight 78 may have an asymmetrical circumference extending around the rotational axis (direction 66). Specifically, the balance weight 78 includes a pair of opposite sides 94. Each of the sides 94 has a flat section 96 designed to reduce a distance 98 between the sides 94. The distance 98 may be approximately equal to or slightly less than the opening width 92. Accordingly, the balance weight 78 may be inserted into the groove 76 through the opening with the flat sections 96 disposed adjacent to the tapered sides 86.

The balance weight 78 also includes another pair of opposite sides 100 disposed between and extending generally perpendicular to the sides 94. Each of the sides 100 may be tapered at an angle corresponding to the tapered sides 86 of the groove 76. The sides 100 may be separated by a distance 101 that is greater than the distance 98 separating the sides 94. In certain embodiments, the tapered sides 100 may converge towards one another away from a rear surface 102 of the balance weight 78 at angles of at least approximately 10, 20, 30, 40, 50, 60, 70, 80, or 90 degrees. Moreover, in certain embodiments, the tapered sides 100 also may include a reverse tapered section where the sides 100 converge towards one another in the opposite direction (e.g., towards the rear surface 102). However, in other embodiments, the tapered sides 100 only may converge away from the rear surface 102.

The balance weight 78 may be inserted into the groove 76 while the tapered sides 100 are generally perpendicular to the tapered sides 86 of the groove 76. After the balance weight 78 is inserted into the groove 76, the weight 78 may be rotated by approximately ninety degrees in the circumferential direction 68 to dispose the sides 100 adjacent to the tapered sides 86 of the groove 76. After rotation, the sides 100 may be generally parallel to the tapered sides 86 of the groove 76. The distance 101 between the sides 100 may be slightly smaller than the base width 90, but larger than the opening width 92 to secure the balance weight 78 within the groove 76 after rotation.

The balance weight 78 also includes a front surface 104 disposed opposite to the rear surface 102. Upon insertion into the groove 76, the rear surface 102 may be adjacent to the base 84 and the front surface 104 may project from the groove 76. The front surface 104 includes a center opening 106 surrounded by a pair of apertures 108. In certain embodiments, the center opening 106 and the apertures 108 may be threaded to receive setscrews and/or an insertion tool for placing and/or securing the balance weight 78 within the groove 76.

FIG. 6 depicts the balance weight 78 after insertion within the groove 76. In certain embodiments, the balance weight 78 may be inserted by hand within the groove 76, while in other embodiments, an insertion tool, such as a threaded rod, may be inserted into the center opening 106 to facilitate insertion and/or rotation of the balance weight 78 within the groove 76. Upon insertion, the base 102 of the balance weight 78 may rest on the base 84 of the groove 76, and the opposing flat sections 96 may be disposed adjacent to the tapered sides 86 of the groove 76. The flat sections 96 may be separated by the width 98 that is approximately equal to or slightly smaller than the distance 92 separating the tapered sides 86. The reduced width 98 may allow the balance weight 78 to be inserted into the groove 76 when the flat sections 96 are aligned with the tapered sides 86.

After insertion, the balance weight 78 may be rotated approximately ninety degrees in the circumferential direction 68 to dispose the opposite sides 100 adjacent to the tapered sides 86. Each of the opposite sides 100 includes a cam surface 110 that is tapered in the circumferential direction 68 about the rotational axis (direction 66). The cam surfaces 110 may include rounded corners disposed generally opposite to one another and disposed between the sides 100 and 96. Moreover, the cam surfaces 110 may be tapered in a direction generally perpendicular to the axis of rotation (direction 66). The cam surfaces 110 may facilitate rotation of the balance weight 78 within the groove 76. For example, the balance weight 78 may be rotated along the cam surfaces 110 to rotate the balance weight approximately 90 degrees about the rotational axis (direction 66).

The cam surfaces 110 also may be tapered at an angle corresponding to the taper of the opposite sides 100. In certain embodiments, the taper of the opposite sides 100 may extend continuously into the cam surfaces 110. That is, the cam surfaces 110 may be tapered away from the rear surface 102 towards one another at an angle approximately equal to the angles at which the tapered sides 100 converge towards each other. In certain embodiments, the cam surfaces 110 may converge towards one another away from the rear surface 102 (and towards the front surface 104) at angles of at least approximately 10, 20, 30, 40, 50, 60, 70, 80, or 90 degrees.

FIG. 7 is a cross-sectional view taken along line 7-7 and depicting the balance weight 78 inserted within the groove 76 prior to rotation. The rear surface 102 of the balance weight 78 may rest against the base 84 of the groove 76. The flat sections 96 are disposed adjacent to the tapered sides 86 with open spaces 112 between the flat sections 96 and the tapered sides 86. The flat sections 96 are spaced apart by the distance 98, which is approximately equal to or slightly less than the width 100 between the tapered sides 94. After rotation, the open spaces 112 may be reduced by the greater width 101 existing between the opposite sides 100, shown in FIG. 6.

Figures 8, 9:
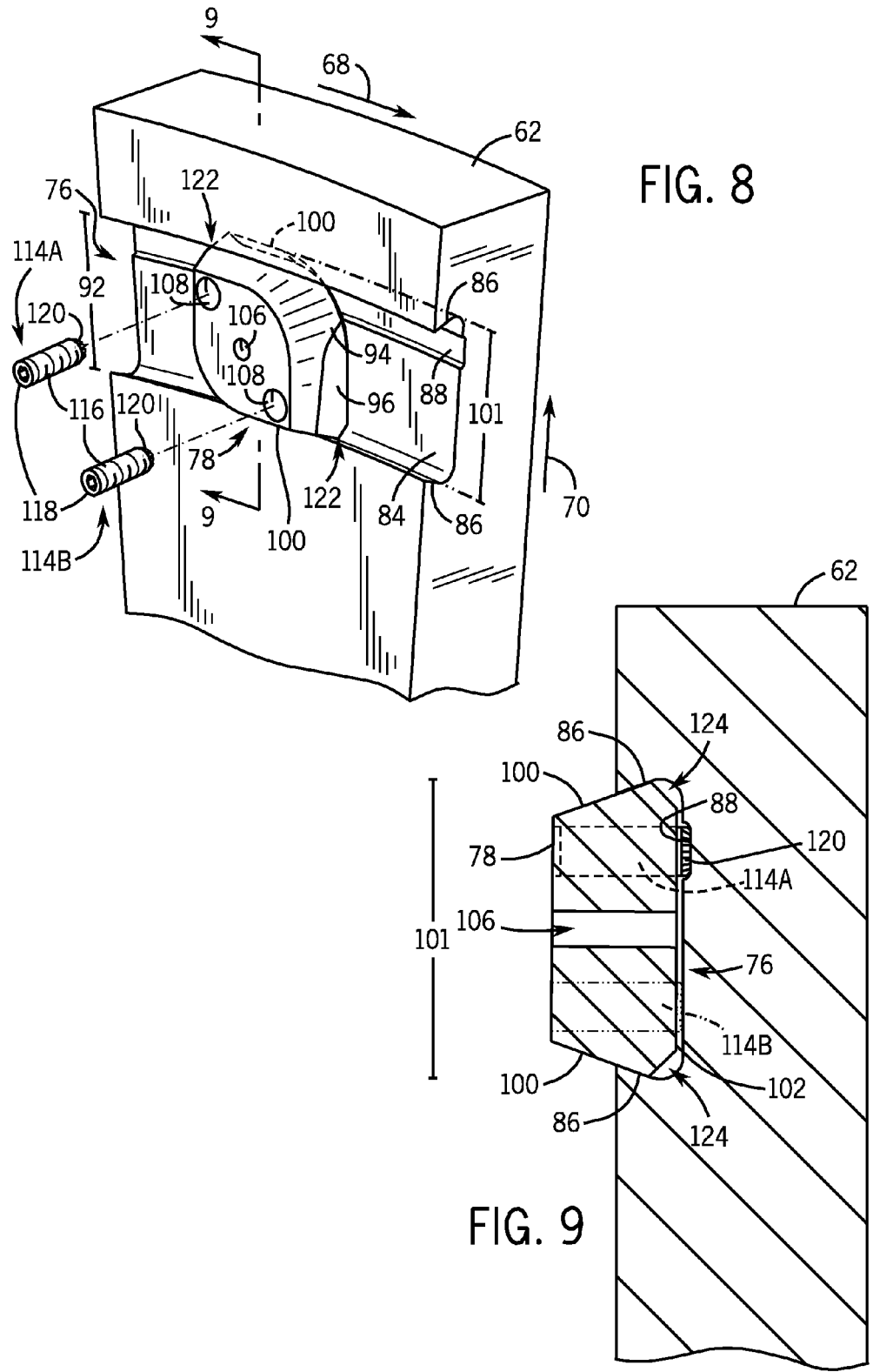
FIG. 8 is a perspective view of the wheel of FIG. 5 with the balance weight rotated within the groove.
FIG. 9 is a cross-sectional view through the wheel of FIG. 8 taken along line 9-9.

FIG. 8 depicts the balance weight 78 after rotation within the groove 76. The opposite sides 100 extend into the groove 76 in the radial direction 70 to approach and/or to contact the tapered sides 86. The opposite sides 100 are separated by a width 101 that is greater than the width 92 of the opening to the groove 76, which may serve to retain the balance weight 78 within the groove 76. For example, the balance weight 78 may be retained within the groove 76 by a compressive or interference fit where the opposite sides 100 interface with the tapered sides 86.

After rotation, the balance weight 78 also may be secured within the groove 76 by inserting fasteners, such as setscrews 114A and 114B, within the apertures 108. The setscrews 114A and 114B may include threads 116 designed to mate with threads inside the apertures 108. The setscrews 114A and 114B also may include an engagement feature 118, such as an Allen head, slot, socket, Hex key, Phillips key, or the like, for receiving a complementary tool, such as an Allen head wrench, socket wrench, screwdriver, or the like, for driving the setscrews 114A and 114B into the apertures 108. Opposite to the engagement feature 118, the setscrews 114A and 114B may include a gnarled or toothed bottom 120 designed to cut into or engage the base 84 of the groove 76 or the slot 88 within the groove 76. Instead of, or in addition to, using the setscrews 114A and 114B, the balance weight 78 may be staked within the groove 76. For example, the balance weight 78 and the groove 76 may be staked at the locations 122 to deform the surface of the balance weight 78 and/or the groove 76 to secure the groove 76 and the balance weight 78 to one another. However, in other embodiments, the balance weight 78 may be secured within the groove 76 without staking. Further, the balance weight 78 may be held in place by any combination of staking, setscrews 114A and 114B and/or a compressive fit.

FIG. 9 is a cross-sectional view taken along line 9-9 and depicting the balance weight 78 inserted within the groove 76 after rotation. The opposite sides 100 are adjacent to the tapered sides 86 of the groove 76. As seen by comparing FIGS. 7 and 9, after rotation, the sides 100 of the balance weight 78 extend radially (direction 70) into the groove 76 to reduce the size of the open spaces 112 shown in FIG. 7, to smaller spaces 124. The upper setscrew 114A extends into the slot 88 within the groove 76. The setscrew 114A may impede further rotation and/or impede reverse rotation of the balance weight 78 within the groove 76. The lower setscrew 114B contacts the base 84 of the groove 76. Specifically, the toothed bottom 120 shown in FIG. 8 may engage the base 84 to raise or offset the rear surface 102 of the balance weight 78 from the base 84 of the groove 76. However, in other embodiments, the rear surface 102 may be disposed against the base 84. Further, in certain embodiments, the slot 88 may be omitted and both of the setscrews 114A and 114B may engage the base 84 of the groove 76. Moreover, in other embodiments, the slot 88 may be located along a portion of the groove 76 that generally aligns with the setscrew 114B. In these embodiments, the setscrew 114B may extend into the slot 88 while the other setscrew 114A engages the base 84.

Figure 10:
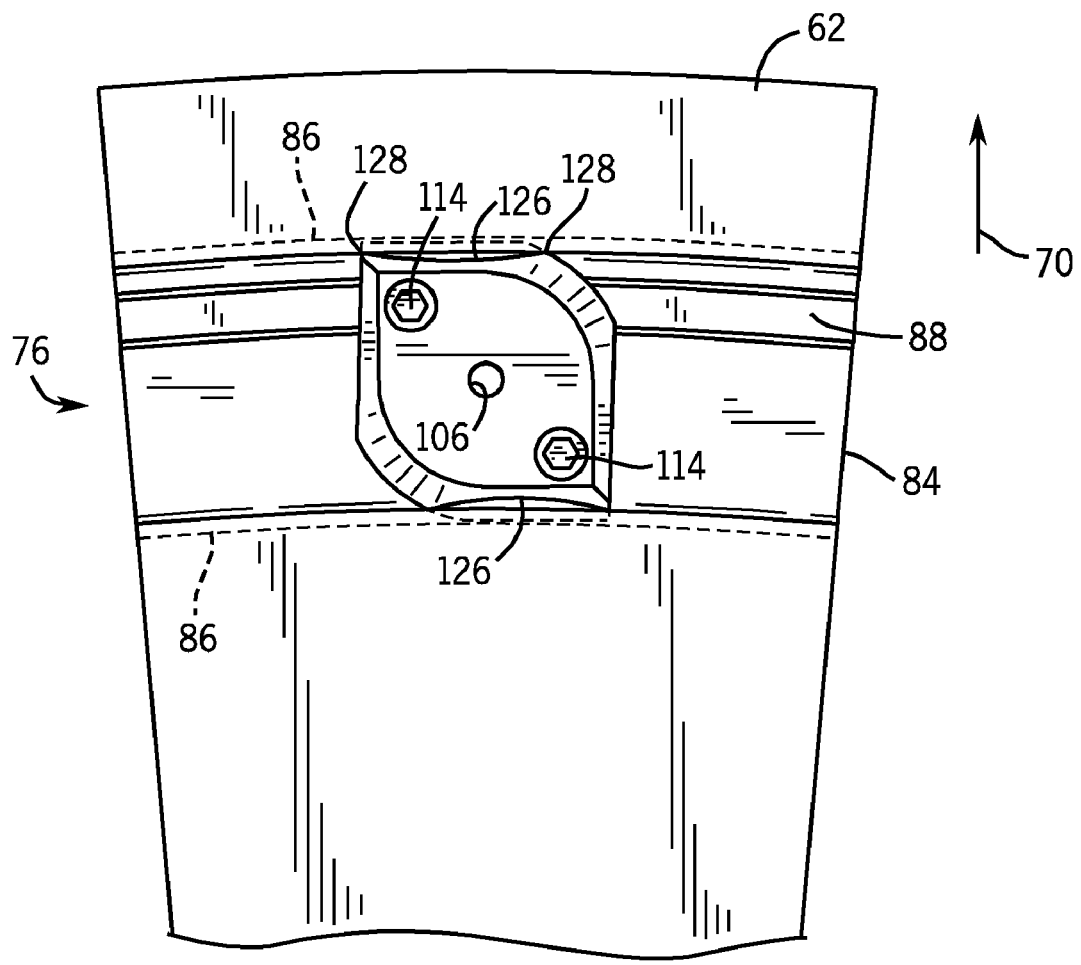
FIG. 10 is a front view of the wheel of FIG. 5 depicting another embodiment of the balance weight rotated within the groove.

FIG. 10 is a front view of another embodiment of the balance weight 78 inserted and rotated within the groove 76. The balance weight 78 is generally similar to the balance weight 78 described above with respect to FIGS. 5-9. However, the opposite sides 100 include recessed portions 126 of a generally concave shape. The recessed portions 126 provide two contact points 128 for each side 100 to contact the tapered sides 86. The two contact points 128 may distribute the pressure (e.g., centrifugal force when the wheel 62 is rotating) exerted by the balance weight 78 on the tapered sides 86. In other embodiments, multiple recessed portions 126 may be included within one or both of the opposite sides 100.

The relative shapes, sizes, and geometries of the balance weight 78 and the groove 76 are provided by way of example only, and are not intended to be limiting. For example, the angles of the tapered sides 100 of the balance weight 78 and/or the angles of the tapered sides 86 of the groove 76 may vary from approximately at least 1-90 degrees. In another example, the curvature of the cam surfaces 110 may vary. Moreover, the relative sizes of the slot 88, the open spaces 112 and 124, the groove 76 and the balance weight 78 may vary depending on factors such as the type of rotary component employed, the type of rotary machine, the operating capacity, and the operating hours, among others. Further, although the grooves 76 are shown in FIGS. 5-10 in the context of a turbine wheel 62, similar features may exist when the grooves 76 are employed in another rotary component, such as the rotor flange 82 shown in FIG. 4.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
 a rotary machine, comprising:
  a rotary component comprising a groove having a base and first tapered sides converging toward one another in a first direction away from the base to form an opening; and
  a balance weight disposed in the groove, wherein the balance weight comprises a body, a first pair of balance weight tapered sides converging toward one another in the first direction and offset from one another by a first distance, and a second pair of balance weight tapered sides converging toward one another in the first direction and offset from one another by a second distance greater than the first distance;
 wherein each of the first pair of balance weight tapered sides comprises a flat section that extends approximately perpendicular to the base and that is configured to offset the first pair of balance weight tapered sides from one another by the first distance; and
 wherein the balance weight is configured to pass through the opening into the groove and rotate to engage the first tapered sides of the groove and the second pair of balance weight tapered sides.

2. The system of claim 1, wherein the balance weight comprises opposite cam surfaces about a rotational axis of the balance weight, and wherein the cam surfaces are configured to rotate the second pair of balance weight tapered sides from a first position generally perpendicular to the first tapered sides to a second position generally parallel to the first tapered sides.

3. The system of claim 1, wherein the first distance is less than a width of the opening and the second distance is greater than the width of the opening.

4. The system of claim 1, wherein the body of the balance weight comprises at least one aperture extending therethrough and configured to receive a fastener to secure the balance weight to the groove.

5. The system of claim 4, comprising the fastener disposed in the aperture to offset a rear surface of the balance weight from the base of the groove.

6. The system of claim 4, wherein the base extends between the first tapered sides, wherein the groove comprises a slot extending circumferentially in the base, and wherein the slot is configured to receive the fastener to inhibit rotation of the balance weight.

7. The system of claim 1, wherein the balance weight is secured within the groove without staking.

8. The system of claim 1, wherein the opening has a width that is uniform around a circumference of the rotary component.

9. The system of claim 1, wherein the rotary machine comprises a compressor, a generator, a gas turbine, a steam turbine, a wind turbine, a hydro turbine, or a combination thereof.

10. The system of claim 1, wherein the opposite cam surfaces are at least partially angled toward one another in a direction away from the base along the rotational axis, and wherein the opposite cam surfaces and the opposite tapered sides converge at substantially the same angle.

11. The system of claim 1, wherein at least one of the second balance weight tapered sides comprises a recess extending along the circumference to create multiple contact points between the at least one second balance weight tapered side and the groove.

12. A system, comprising:
a balance weight configured to mount in a groove of a rotary component of a turbine engine, wherein the balance weight comprises a base, a rotational axis extending from the base, and a circumference having opposite cam surfaces about the rotational axis, wherein the opposite cam surfaces are at least partially angled toward one another in a direction away from the base along the rotational axis, wherein the balance weight comprises a first pair of opposite flat sides separated by a first width and a second pair of opposite tapered sides separated by a second width greater than the first width, wherein each of the opposite cam surfaces is disposed between one of the flat sides and one of the tapered sides along the circumference; and
wherein at least one of the opposite tapered sides comprises a recess extending along the circumference to create multiple contact points between the at least one opposite tapered side and the groove.

13. The system of claim 12, wherein the balance weight is configured to pass into the groove at a first position and rotate within the groove along the opposite cam surfaces to gradually compress the balance weight in the groove at a second position approximately 90 degrees about the rotational axis from the first position.

14. The system of claim 12, wherein the opposite tapered sides converge towards one another away from the base at angles of approximately 10-50 degrees and wherein the angles are generally parallel to corresponding angled surfaces of the groove.

15. The system of claim 12, comprising a turbine rotor, wherein the groove is disposed in a flange of the turbine rotor or in a turbine wheel encircling the turbine rotor.

16. A system, comprising:
a rotary component comprising an annular groove with a generally uniform opening and tapered sides converging towards one another from a base of the annular groove to the generally uniform opening; and
a balance weight disposed in the annular groove, wherein the balance weight comprises an asymmetrical circumference with a first pair of opposite sides separated by a first width and a second pair of opposite sides separated by a second width greater than the first width, wherein the balance weight is configured to pass through the generally uniform opening when the first pair of opposite sides are generally parallel to the tapered sides and rotate within the annular groove to dispose the second pair of opposite sides generally parallel to the tapered sides, and wherein the first pair of opposite sides comprises opposite tapered sides converging towards one another away from the base and each comprising a flat section that extends approximately perpendicular to the base and that is configured to offset the first pair of opposite sides from one another by the first width.

17. The system of claim 16, wherein the asymmetrical circumference comprises opposite cam surfaces configured to rotate the balance weight within the annular groove.

18. The system of claim 16, wherein the system comprises a turbine engine.

19. The system of claim 16, wherein at least one of the opposite tapered sides comprises a recess extending along the circumference to create multiple contact points between the at least one opposite tapered side and the groove.

20. The system of claim 16, wherein the base of the annular groove extends between the tapered sides of the annular groove, and wherein the balance weight comprises at least one fastener extending through the balance weight and into a circumferential slot within the base of the annular groove to secure the balance weight to the annular groove.

* * * * *